United States Patent
Chapman et al.

(10) Patent No.: US 11,394,473 B2
(45) Date of Patent: Jul. 19, 2022

(54) ADJUSTING AN ERROR VECTOR MEASURE (EVM) WINDOW

(71) Applicant: Telefonaktiebolaget LM Ericsson (publ), Stockholm (SE)

(72) Inventors: Thomas Chapman, Solna (SE); Esther Sienkiewicz, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 80 days.

(21) Appl. No.: 16/963,390

(22) PCT Filed: Jan. 22, 2019

(86) PCT No.: PCT/IB2019/050530
§ 371 (c)(1),
(2) Date: Jul. 20, 2020

(87) PCT Pub. No.: WO2019/145855
PCT Pub. Date: Aug. 1, 2019

(65) Prior Publication Data
US 2021/0367682 A1    Nov. 25, 2021

Related U.S. Application Data

(60) Provisional application No. 62/620,852, filed on Jan. 23, 2018.

(51) Int. Cl.
*H04B 17/10* (2015.01)
*H04B 7/06* (2006.01)
*H04L 27/26* (2006.01)

(52) U.S. Cl.
CPC ......... *H04B 17/104* (2015.01); *H04B 7/0652* (2013.01); *H04L 27/2607* (2013.01)

(58) Field of Classification Search
CPC . H04L 5/0023; H04L 27/2607; H04B 17/318; H04B 17/309; H04B 17/104; H04B 7/0652
See application file for complete search history.

(56) References Cited

U.S. PATENT DOCUMENTS

2008/0019433 A1* 1/2008 Yamanouchi ......... H04L 27/368
375/224
2016/0380682 A1* 12/2016 Sienkiewicz ........ H04B 7/0617
375/267

OTHER PUBLICATIONS

LTE, "3GPP TS 36.104", Jan. 2016, 3GPP, V12.10.0, p. 1-156 (Year: 2016).*
R4-1800956: Nokia et al: "BS EVM window length for NR" 3GPP Draft; EVM Window Length VO3, 3rd Generation Partnership Project (3GPP), Mobile Competence Centre ; 650, Route Des Lucioles ; F-06921 Sophia-Antipolis Cedex ; France, vol. RAN WG4 , No. San Diego, California, US; Jan. 22, 2018-Jan. 26, 2018—Jan. 15, 2018 (Jan. 15, 2018), XP051388580, consisting of 6 pages.

(Continued)

*Primary Examiner* — Sung S Ahn
(74) *Attorney, Agent, or Firm* — Christopher & Weisberg, P.A.

(57) ABSTRACT

According to certain embodiments, a method is performed by a radio node in order to configure a transmitter to communicate a signal. The method determines an Error Vector Measure (EVM) window for the signal. The EVM window is based on at least one of a signal bandwidth, a spectrum utilization, and a cyclic prefix length. The method adjusts the transmitter based on the EVM window.

19 Claims, 18 Drawing Sheets

(56) References Cited

OTHER PUBLICATIONS

R4-1800876: Ericsson: "EVM Window for NR", 3GPP Draft; 3rd Generation Partnershi P Project (3GPP), Mobile Competence Centre ; 650, Route Des Lucioles ; F-06921 Sophia-Antipolis Cedex; France, vol. RAN WG4 , No. San Diego, Cal i fornia, USA; Jan. 22, 2018-Jan. 26, 2018 Jan. 15, 2018 (Jan. 15, 2018) , XP051388444, consisting of 4 pages.
R4-1804986: Ericsson: "EVM Window for NR", 3GPP Draft; 3rd Generation Partnershi P Project (3GPP), Mobi le Competence Centre ; 650, Route Des Lucioles ; F-06921 Sophia-Anti Polis Cedex; France, vol. RAN WG4 , No. Melbourne, Australia; Apr. 16, 2018-Apr. 20, 2018 Apr. 15, 2018 (Apr. 15, 2018), XP051431790, consisting of 6 pages.
International Search Report and Written Opinion of the International Searching Authority dated May 17, 2019 issued in PCT Application No. PCT/IB2019/050530, consisting of 10 pages.
EPO Communication dated Sep. 3, 2021 for Patent Application No. 19707461.0 consisting of 5-pages.

* cited by examiner

ADJUSTING AN ERROR VECTOR MEASURE (EVM) WINDOW

CROSS-REFERENCE TO RELATED APPLICATIONS

This application is a Submission Under 35 U.S.C. § 371 for U.S. National Stage Patent Application of International Application No.: PCT/IB2019/050530, filed Jan. 22, 2019 entitled "ADJUSTING AN ERROR VECTOR MEASURE (EVM) WINDOW," which claims priority to U.S. Provisional Application No. 62/620,852, filed Jan. 23, 2018, entitled "ADJUSTING AN ERROR VECTOR MEASURE (EVM) WINDOW," the entireties of both of which are incorporated herein by reference.

TECHNICAL FIELD

Certain embodiments of the present disclosure relate, in general, to wireless communications and, more particularly, to adjusting an error vector measure (EVM) window.

BACKGROUND

The third generation partnership project (3GPP) has developed a new radio specification known as fifth generation (5G) or New Radio (NR). Currently, 3GPP is finalizing radio performance requirements for the NR specification. NR is based upon so-called Cyclic Prefix Orthogonal Frequency Division Multiplexing (CP-OFDM) and Discrete Fourier Transform Spread OFDM (DFT-S-OFDM) waveforms. CP-OFDM is to be used by the downlink and DFT-S-OFDM for the uplink. Both waveforms are based around the concept of transmitting a waveform using a number of subcarriers that are evenly spaced in the frequency domain. Several options exist for the spacing of the subcarriers. Some of the subcarriers are used for transmitting reference signals (RS). Examples of reference signals include demodulation reference signals (DM-RS), phase tracking reference signals (PT-RS), and channel state information reference signals (CSI-RS). A reference signal may include one or more reference symbols.

FIG. 1 illustrates an OFDM signal in the frequency domain. The OFDM signal is transmitted on certain discrete subcarriers in the frequency domain. A known reference symbol is transmitted on certain subcarriers, as indicated by dashed lines in FIG. 1. Reference symbols are known modulation values, known to both the transmitter and receiver. Since the receiver knows what was sent by the transmitter on these subcarriers, the receiver can compare what it has received with what was transmitted and estimate any distortions that have occurred within the transmitter hardware, radio channel, and receiver hardware. Other subcarriers are used for transmitting control and data. FIG. 2 illustrates the use of reference signals to determine transmitter distortions in which a reference signal as actually received is compared to an ideal reference signal (known in advance) to determine transmitter distortions.

3GPP places several requirements on the quality of the transmitted signal. One of these requirements is Error Vector Measure (EVM). Roughly speaking, the EVM is a percentage distortion between an ideally transmitted signal and a signal that has actually been transmitted (after all transmitter hardware). The objective of EVM is to capture any RF distortions caused by the transmitter compared to what is ideally achievable.

The EVM is defined as follows:

$$EVM = \sqrt{\frac{\sum_{t \in T}\sum_{f \in F(t)} |Z'(t,f) - I(t,f)|^2}{\sum_{t \in T}\sum_{f \in F(t)} |I(t,f)|^2}}$$

where:
T is the set of symbols with the considered modulation scheme being active within the subframe;
F(t) is the set of subcarriers within the $N_{BW}^{RB}$ subcarriers with the considered modulation scheme being active in symbol t;
I(t,f) is the ideal signal reconstructed by the measurement equipment in accordance with relevant transmission models; and
Z'(t,f) is the received signal under test.

Individual EVM measurements on different OFDM symbols may be averaged, usually by means of a root square sum to form an average EVM metric. In general, EVM is measured across all of the resource blocks in a transmitted signal. However, there has been some discussion in NR about introducing an additional EVM requirement measured only on resource blocks at the edge of a frequency allocation. 3GPP places maximum EVM requirements on both the base station (BS) and the user equipment (UE). The maximum EVM depends upon the modulation order. Some example modulation schemes for the physical downlink shared channel (PDSCH) of the BS are as follows:

| Modulation scheme for PDSCH | Required EVM [%] |
| --- | --- |
| Quadrature Phase Shift Keying (QPSK) | 17.5% |
| 16 Quadrature Amplitude Modulation (QAM) | 12.5% |
| 64QAM | 8% |
| 256QAM | 3.5% |

Some distortion that is created by the transmitter is linear in nature and may be mitigated by the receiver. To mitigate such distortion, the receiver examines the received reference symbols from the transmitter, compares them to the ideal reference symbols (which are known to both the transmitter and the receiver), and corrects the received signal control/data tones according to the calculated distortion.

It is preferable not to include linear transmitter distortion that can be removed by the receiver in the EVM metric. For this reason, 3GPP assumes that test equipment for performing the EVM test has a standardized algorithm for correcting the transmitted signal, such as the algorithm specified in 3GPP TS 38.104, Annex E. The structure for the algorithm is illustrated diagrammatically in FIG. 3.

EVM is measured with either a cable from the device under test to the test equipment or Over the Air (OTA) in an anechoic chamber. In both cases, there is no radio channel and thus any distortion corrected by the receiver is related to the transmitter under test.

With CP-OFDM, each transmitted OFDM symbol in the time domain is prefixed with a cyclic repetition of the signal. To receive the OFDM signal, any portion of the transmitted signal, including the cyclic prefix (CP) that is the length of the fast Fourier transform (FFT) needed for the OFDM processing may be selected. In the absence of any other factors, it is better to take the latest possible part of the symbol, as this allows for any inter-symbol interference (ISI) from the previous symbol to die out before the selected samples and thus maximizes protection against multipath channel delay spread. However, when time dispersion due to filtering is considered, since the final samples of the signal may be impacted by interference from the following signal, it may not be optimal to take the final samples of the symbol.

The EVM window, as defined in both long term evolution (LTE) and NR, is centered at the middle of the cyclic prefix. In general, a smaller window size has fewer samples available to the receiver for adjusting receiver timing.

FIG. 4 illustrates a CP-OFDM symbol in the time domain. The CP-OFDM symbol of FIG. 4 includes a CP followed by an original FFT. In the example of FIG. 4, the earliest set of samples the receiver may use for inverse FFT (IFFT) and decoding includes the cyclic prefix, and the latest set of samples the receiver may use for IFFT and decoding includes the original FFT.

In the frequency domain, an OFDM symbol is not sufficiently spectrally confined to enable efficient usage of the radio spectrum. Filtering or time domain windowing is implemented to provide sufficient spectral isolation. In the frequency domain, the filtering or windowing has the effect of narrowing the portion of the spectrum occupied by the signal. An example of spectral confinement in the frequency domain is illustrated in FIG. 5. In the time domain, the filtering or windowing has the effect of spreading the signal out in time. An example of the impact of spectral confinement in the time domain is shown in FIG. 6.

For LTE, a so-called spectrum utilization of 90% is mostly defined. This means that for a given allocated bandwidth B of spectrum, 90% of B is used for signal transmission and the remaining 10% is used as a guard (5% on either side of the signal) such that interference between the LTE carrier and neighboring systems in the frequency domain is mitigated. For NR, the guard size is significantly reduced compared to LTE. This implies the need for sharper filtering or windowing, and the associated spreading out in the time domain.

The EVM metric is measured twice using the earliest possible and latest possible parts of the CP-OFDM symbols. Together, these two parts define the EVM window. For LTE, the earliest and latest parts are near the start and the end of the cyclic prefix. Taking the EVM measurement twice demonstrates that EVM can be met regardless of how the receiver selects the signal. Thus, both channel delay spread and receiver timing errors can be accommodated without degradation to the EVM.

The period between the earliest and latest time at which the FFT can be extracted from the OFDM symbol without degradation of the EVM is known as the EVM window (see FIG. 4).

For NR, a similar EVM window will be specified. However, since the filtering or windowing needs to be sharper, the spill-over of the filter tail from one symbol to the next can become significant, causing a certain amount of inter-symbol interference. For filtering, due to the nature of the finite impulse response (FIR) filter, inter-symbol interference can occur either from the previous symbol or from the next symbol (see FIG. 6).

Due to the filter (or window) interference tail, for NR it is not possible to support an EVM window that covers the whole of the cyclic prefix. Instead, a smaller window must be defined. However, reducing the size of the EVM window will reduce the amount of delay spread and receiver timing deviation that the system is able to manage effectively.

SUMMARY

There currently exist certain challenges. For example, because NR may require sharp filtering or windowing to achieve increased spectrum utilization, the EVM window length may need to be reduced. However, reducing the window length may reduce the accuracy of the EVM.

Certain aspects of the present disclosure and their embodiments may provide solutions to these or other challenges. For example, certain aspects of the present disclosure determine the reduction in the EVM window length based upon one or more factors, such as the bandwidth of the signal, the spectrum utilization, and the cyclic prefix length. In certain embodiments, the EVM window length is adjusted for transmission of a signal (and within which distortion free reception is provided) based on the bandwidth of the signal. For example, when filtering is used for spectrum confinement, the size of the filter in samples is proportional to the needed sharpness of the filter. The time duration of the cyclic prefix is proportional to the subcarrier spacing. However, the number of samples in the cyclic prefix for a given CP duration is proportional to the bandwidth; the greater the subcarrier spacing, the greater the number of samples in the cyclic prefix for a given subcarrier spacing. Thus, the EVM window length as a fraction of the CP is adapted according to the signal bandwidth. The wider the signal bandwidth, the larger the EVM window is allowed to become as a function of the CP length. Thus, the filter length, which is independent of the signal bandwidth, can be accommodated while the EVM window length impact can be reduced for increased bandwidths.

It should be noted that if the 3GPP specifications introduce a requirement on edge physical resource block (PRB) EVM, then the EVM window for the edge EVM requirement could differ from the EVM window defined for the general EVM requirement over all PRBs. Certain embodiments disclosed herein may be applied either for the traditional EVM requirement over all PRBs within the bandwidth, or on a new requirement on edge EVM, or on both.

There are proposed herein various embodiments which address one or more of the issues disclosed herein.

According to certain embodiments, a method is performed by a radio node in order to configure a transmitter to communicate a signal. The method determines an EVM window for the signal. The EVM window is based on at least one of a signal bandwidth, a spectrum utilization, and a cyclic prefix length. The method adjusts the transmitter based on the EVM window.

According to certain embodiments, a radio node comprises a transmitter and processing circuitry. The processing circuitry is configured to determine an EVM window for a signal to be communicated by the transmitter. The EVM window is based on at least one of a signal bandwidth, a spectrum utilization, and a cyclic prefix length. The processing circuitry is configured to adjust the transmitter based on the EVM window.

According to certain embodiments, a computer program comprises instructions which when executed on a computer determine an EVM window for a signal to be transmitted by a transmitter of a radio node. The EVM window is based on at least one of a signal bandwidth, a spectrum utilization, and a cyclic prefix length. The computer program further comprises instructions which when executed on a computer adjust the transmitter based on the EVM window.

Certain embodiments of the above-described method, radio node, and/or computer program may include one or more additional features, such as any one or more of the following:

In some embodiments, the signal is communicated after adjusting the transmitter based on the EVM window.

In some embodiments, the EVM window increases as the signal bandwidth increases from a first signal bandwidth to a second signal bandwidth. In some embodiments, the EVM window is based at least in part on a scaling. The scaling may be based at least in part on the signal bandwidth, for example.

In some embodiments, the EVM window increases as the cyclic prefix length increases from a first cyclic prefix length to a second cyclic prefix length. In some embodiments, the EVM window is based at least in part on a scaling. The scaling may be based at least in part on the cyclic prefix length, for example.

In some embodiments, determining the EVM window includes obtaining a first percentage of cyclic prefix time (percentage of CP time utilized by a filter to transmit a pre-determined bandwidth), determining a scaling factor based on dividing the pre-determined bandwidth by the signal bandwidth, determining a second percentage of cyclic prefix time (percentage of CP time utilized by the filter to transmit the signal bandwidth), and subtracting the second percentage of cyclic prefix time from 100% to obtain the EVM window. The second percentage of cyclic prefix time is determined based on multiplying the scaling factor by the first percentage of cyclic prefix time.

In some embodiments, adjusting the transmitter comprises adjusting filter parameters of the transmitter based on the EVM window.

In some embodiments, to adjust the transmitter based on the EVM window, the method, radio node, or computer program determines a percentage of cyclic prefix time utilized by the EVM window, determines an EVM window length based on multiplying the cyclic prefix length by the percentage of cyclic prefix time utilized by the EVM window, and obtains obtain a portion of cyclic prefix time available for a filter based on subtracting the EVM window length from the CP length.

In some embodiments, the radio node comprises a wireless device.

In some embodiments, the radio node comprises a base station.

In some embodiments, such as certain embodiments in which the EVM window is based at least on the signal bandwidth, the method, radio node, or computer program may determine the signal bandwidth for communicating the signal. The signal bandwidth may be determined prior to determining the EVM window.

In some embodiments, the EVM window corresponds to a percentage of cyclic prefix length.

According to certain embodiments, a method is performed by a radio node for configuring a receiver to receive a signal. The method comprises determining an EVM window for a signal. The EVM window is based on at least one of a signal bandwidth, a spectrum utilization, and a cyclic prefix length. The method further comprises adjusting receiver timing based on the EVM window.

According to certain embodiments, a radio node comprises a receiver and processing circuitry. The processing circuitry is configured to determine an EVM window for a signal to be received by the receiver. The EVM window is based on at least one of a signal bandwidth, a spectrum utilization, and a cyclic prefix length. The processing circuitry is further configured to adjust the receiver timing based on the EVM window.

According to certain embodiments, a computer program comprises instructions which when executed on a computer determine an EVM window for a signal to be received by a receiver of a radio node and adjust the receiver timing based on the EVM window. The EVM window is based on at least one of a signal bandwidth, a spectrum utilization, and a cyclic prefix length.

Certain embodiments of the above-described method, radio node, and/or computer program may include one or more additional features, such as any one or more of the following:

In some embodiments, the signal is received after adjusting the receiver timing based on the EVM window.

In some embodiments, the EVM window increases as the signal bandwidth increases from a first signal bandwidth to a second signal bandwidth. In some embodiments, the EVM window is based at least in part on a scaling. The scaling may be based at least in part on the signal bandwith, for example.

In some embodiments, the EVM window increases as the cyclic prefix length increases from a first cyclic prefix length to a second cyclic prefix length. In some embodiments, the EVM window is based at least in part on a scaling. The scaling may be based at least in part on the cyclic prefix length, for example.

In some embodiments, the radio node comprises a wireless device.

In some embodiments, the radio node comprises a base station.

In some embodiments, such as certain embodiments in which the EVM window is based at least on the signal bandwidth, the method, radio node, or computer program may determine the signal bandwidth for receiving the signal. The signal bandwidth may be determined prior to determining the EVM window.

In some embodiments, the EVM window corresponds to a percentage of cyclic prefix length.

Certain embodiments may provide one or more of the following technical advantage(s). Certain embodiments enable a flexible approach to setting a requirement on the EVM window for a transmitter, such that the EVM window can be kept as small as needed in cases in which the impact of spectral confinement is independent of the signal bandwidth. Certain embodiments provide simple methods to calculate an EVM window if, as expected in the future, new bandwidths are introduced. The present disclosure also proposes a simple expression/equation to provide an equivalent EVM requirement for all bandwidths for a given spectral utilization and CP length.

BRIEF DESCRIPTION

DETAILED DESCRIPTION

Figure 1:
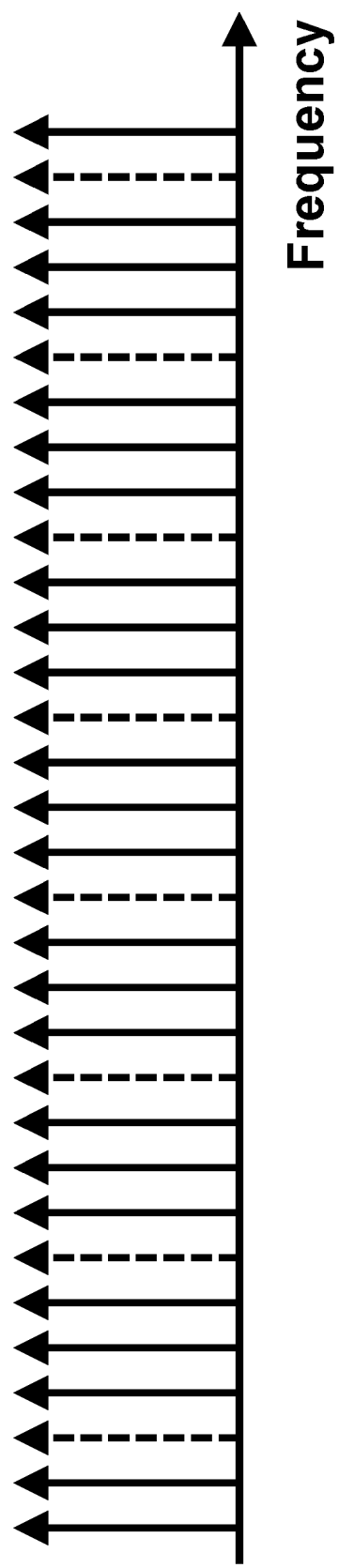
FIG. 1 illustrates an OFDM signal in the frequency domain.
Figure 2:
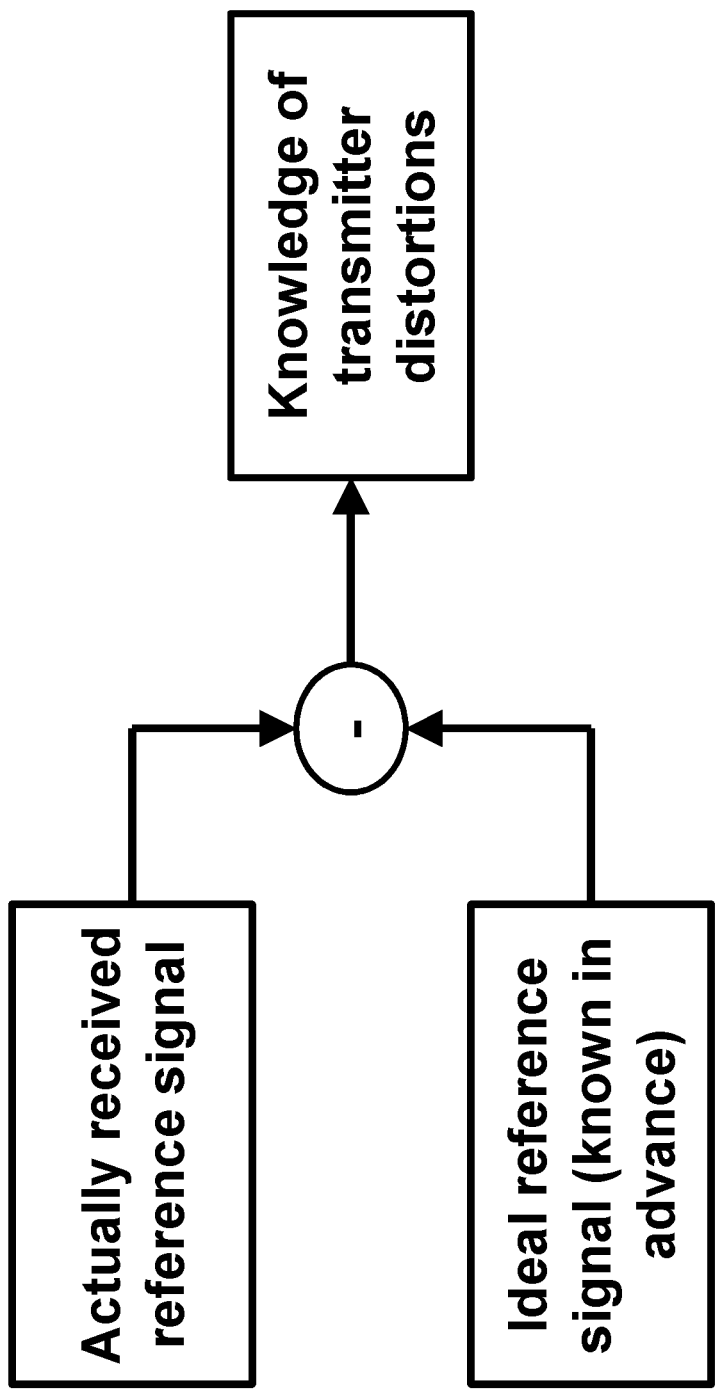
FIG. 2 illustrates the use of reference signals to determine transmitter distortions.
Figure 3:
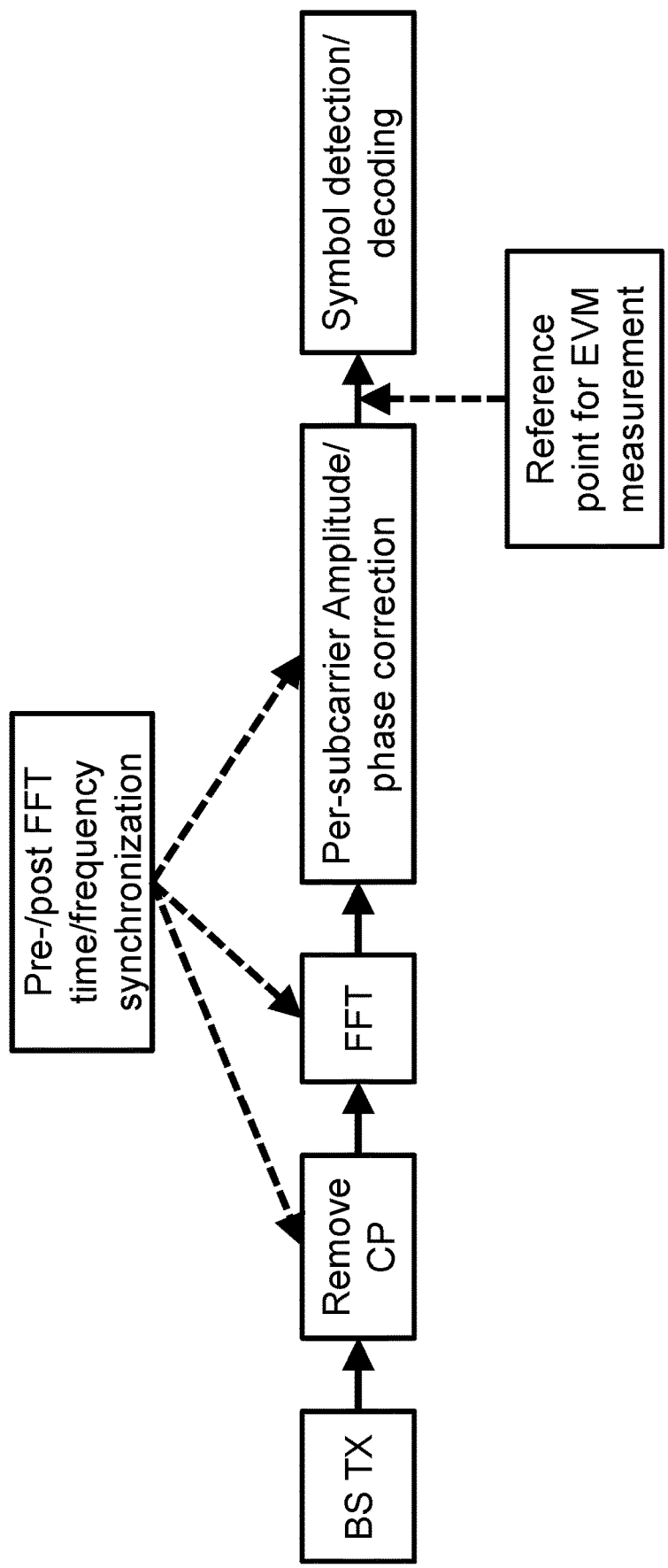
FIG. 3 illustrates an example of an algorithm for determining an EVM measurement.
Figure 4:
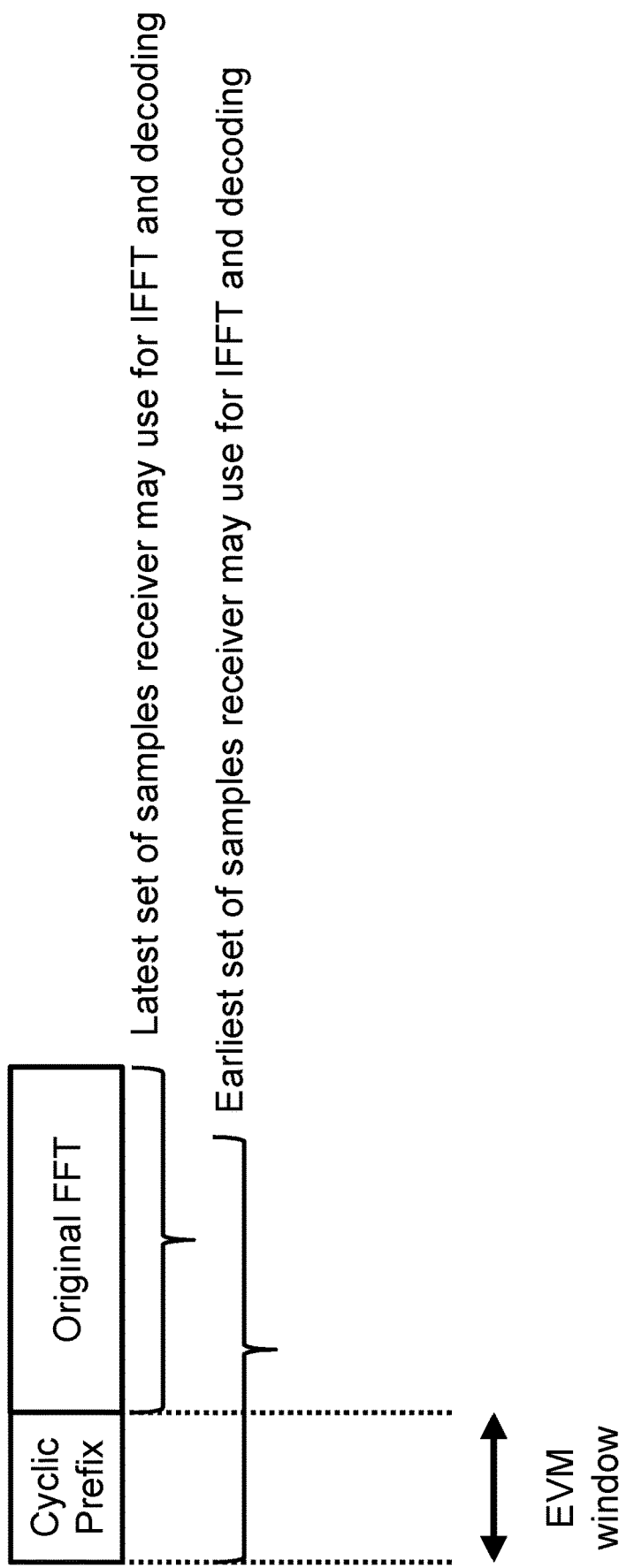
FIG. 4 illustrates an example of a CP-OFDM symbol in the time domain.
Figure 5:
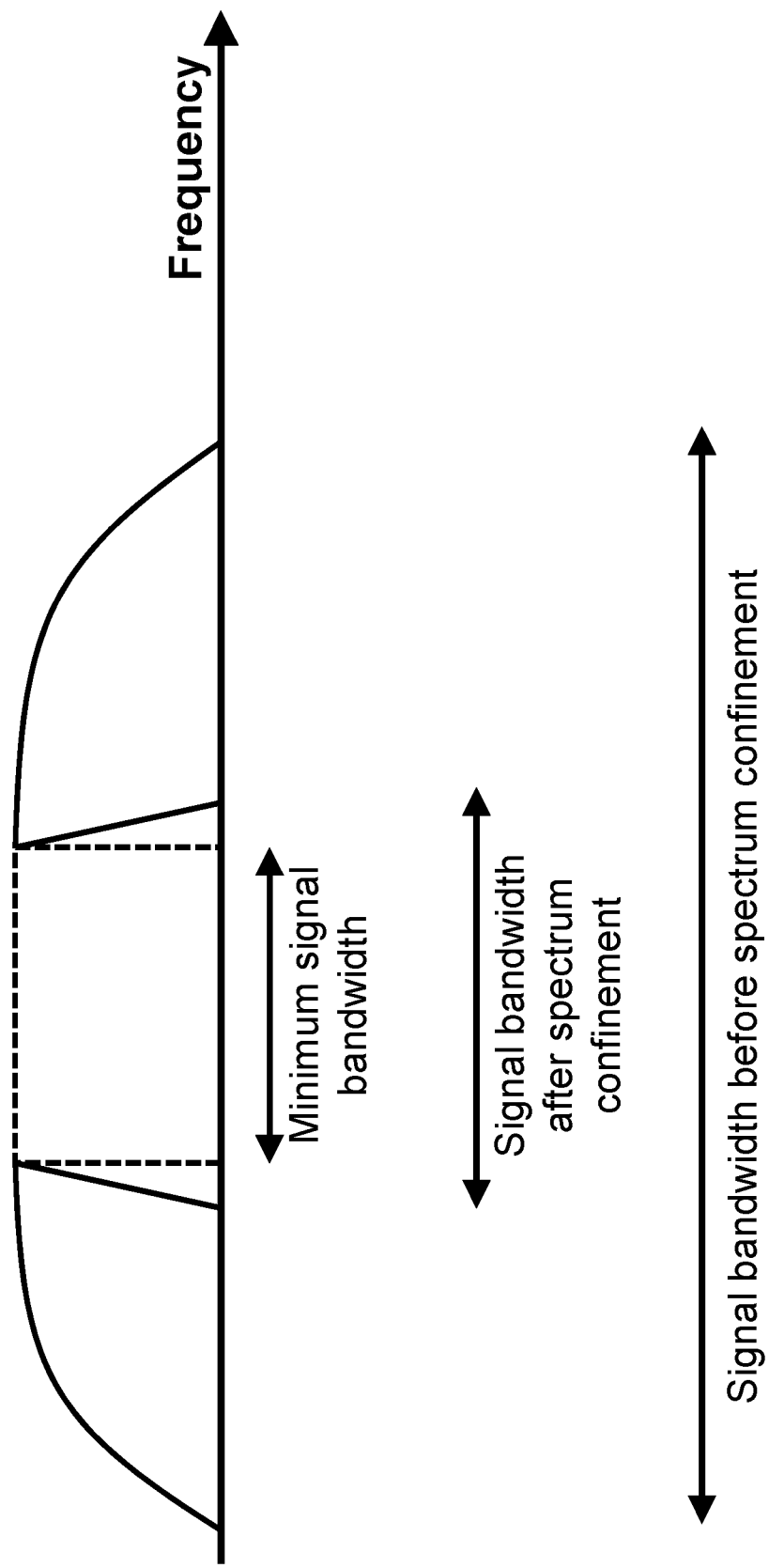
FIG. 5 illustrates an example of spectral confinement in the frequency domain.
Figure 6:
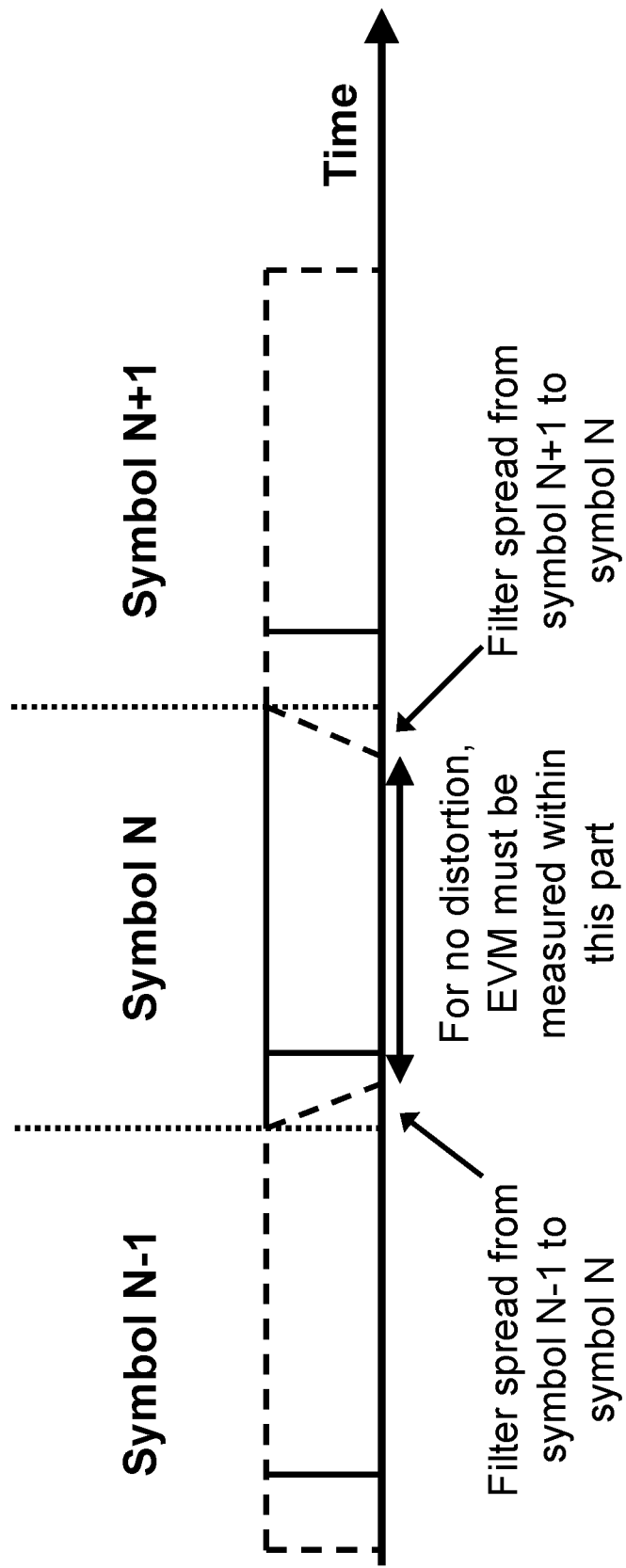
FIG. 6 illustrates an example of the impact of spectral confinement in the time domain.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

NR defines a set of bandwidths below 6 GHz. These bandwidths include 5, 10, 15, 20, 25, 30, 40, 50, 60, 70, 80, 90, and 100 MHz. In a first example, a spectrum utilization of around 95% is defined for bandwidths of greater than 25 MHz. The spectrum utilization can be achieved using a 127 tap FIR filter.

For a 15 khz subcarrier spacing, the CP length for NR is defined to be 4.76 microseconds. Reserving enough time for a 127 tap filter within the CP implies around 60% of the CP time for 25 MHz. Thus, the EVM window is 40% of the CP.

For the other bandwidths, the EVM window is scaled according to the following formula:

$$\text{EVM window} = 100\% - 60\% * 25/\text{Bandwidth (MHz)}$$

In this way, the EVM window can be scaled with the bandwidth in order to reserve sufficient space within the CP in order to accommodate the filter impulse response without causing inter-symbol interference (ISI), while also minimizing the reduction in EVM window.

The correct scaling provides a compromise between avoiding ISI and providing flexible timing for the receiver while meeting EVM. In general, a smaller window may allow for avoiding ISI and other RF impairments. However, if the window is too small, timing flexibility may become unnecessarily reduced (e.g., a somewhat larger window could still provide sufficient avoidance of ISI and RF impairment without excessively reducing timing flexibility). This is why the scaling approach proposed in this disclosure is important, in order to avoid having requirements that are relaxed when applied to larger bandwidths but are unnecessarily stringent when applied to smaller bandwidths.

In a second example, an EVM requirement is specified for a system intended for operation in mm wave spectrum. Bandwidths of 50, 100, 200, and 400 MHz are defined. A subcarrier spacing of 120 khz is operated.

The spectrum utilization for the 100 MHz bandwidth is 95%. In this case, 200 taps are required for the spectral confinement filtering. For 100 MHz bandwidth, 60% of the CP is reserved for the filter impulse response leading to an EVM window of 40% of the CP. For the 200 and 400 MHz bandwidths, the portion of the CP reserved for the filter impulse response is reduced by a factor of 2 and 4 respectively, leading to EVM windows of 70% and 85%.

Currently, LTE provides different window lengths that depend on channel bandwidth size, as described in the background section. However, the LTE values do not relate to scaling of the window length as described in this disclosure. If the LTE tables currently shown in TS 36.104 were extended, the number of tables would increase to accommodate the different spectrum utilization and bandwidths as described, however the scaling would not be captured. Certain embodiments of the present disclosure allow for scaling the EVM window length (e.g., based at least in part on bandwidth, spectrum utilization, and/or cyclic prefix length) and capturing the scaling in a table. In addition, certain embodiments of the present disclosure propose a simple formulation between bandwidth and scaling the number of samples to give an expression to handle all variations without numerous tables and different values.

Figure 7:
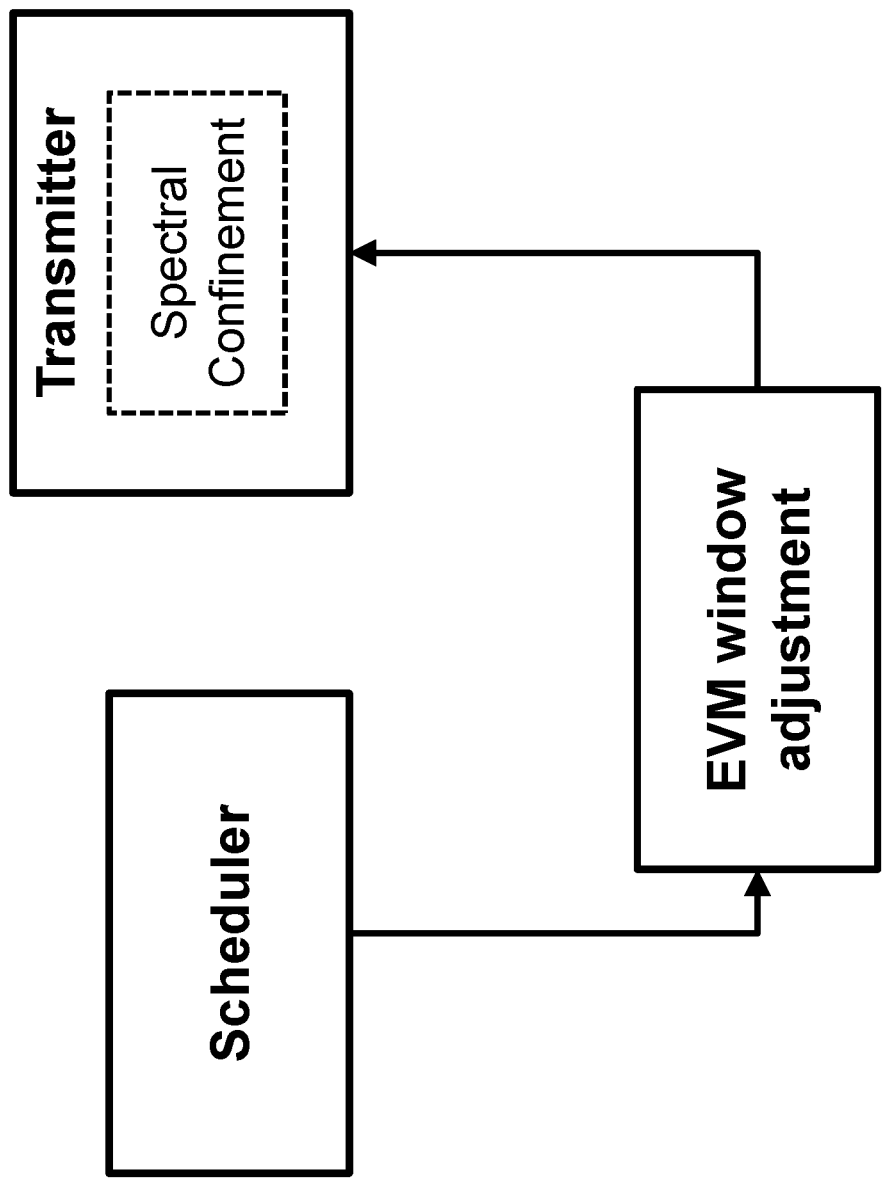
FIG. 7 illustrates an example of a node for transmitting a signal according to an adjusted EVM window, in accordance with certain embodiments of the present disclosure.
Figure 8:
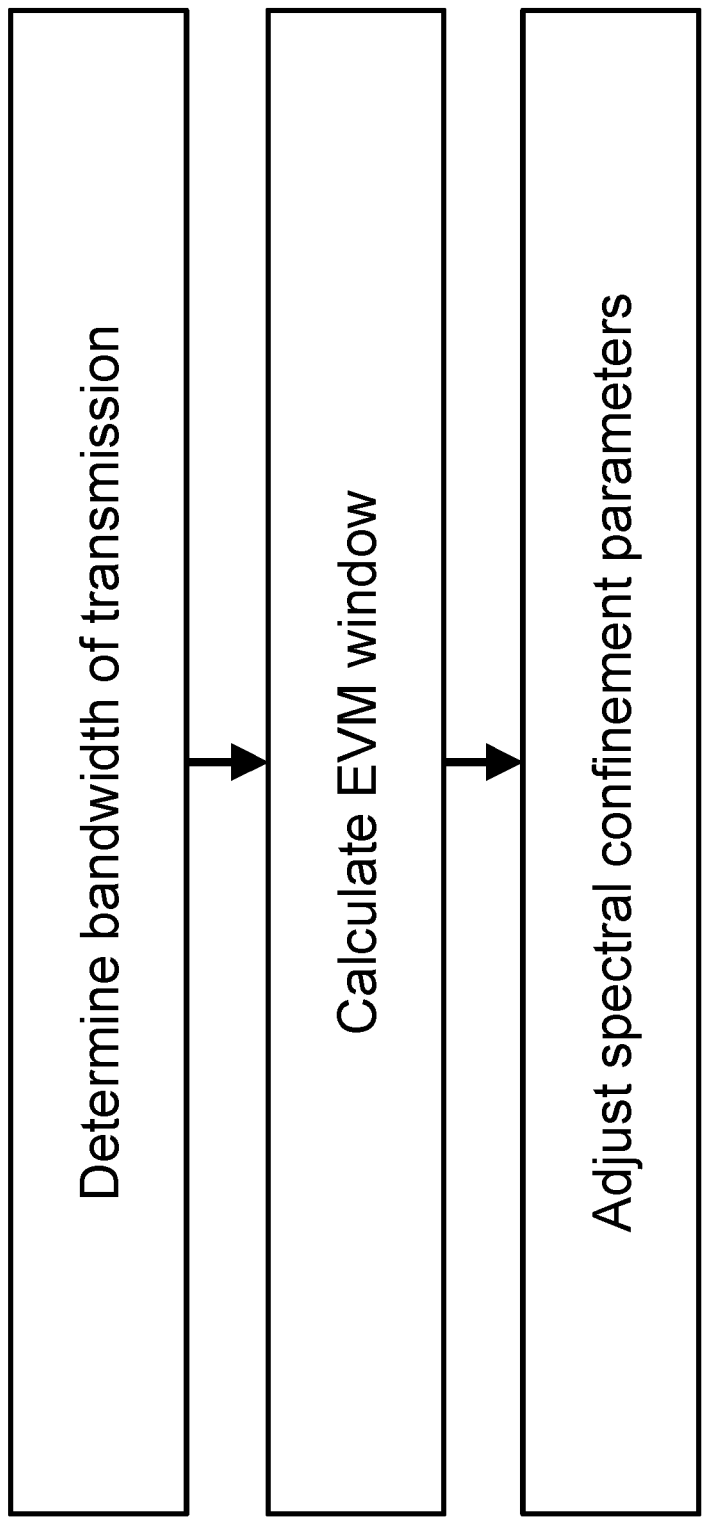
FIG. 8 illustrates an example of a method for transmitting a signal according to an adjusted EVM window, in accordance with certain embodiments of the present disclosure.

In addition to the above discussed methods, one example of possible implementation of the disclosure is depicted in FIG. 7. A radio node (which may be a base station or a user equipment) is equipped with a transmitter, a scheduler, a spectral confinement algorithm and an EVM window adjustment algorithm. In certain embodiments, the radio node performs the method depicted in FIG. 8. For example, the scheduler determines a bandwidth for transmission and informs the transmitter and the EVM window adjustment unit of the bandwidth. The EVM window adjustment unit determines the EVM window. The EVM window adjustment may also determine the amount of time available for the transmitter filtering. The transmitter adjusts spectral confinement parameters. For example, the transmitter filter parameters are adjusted according to the EVM window length determined by the EVM window determination unit.

Figure 9:
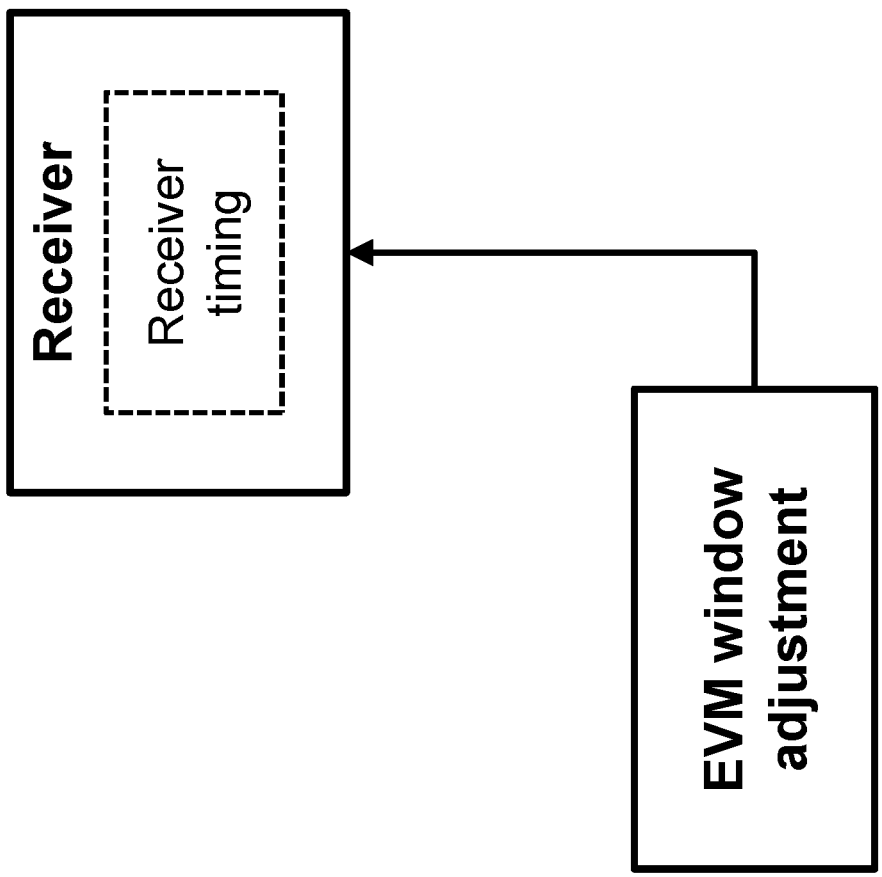
FIG. 9 illustrates an example of a node for receiving a signal according to an adjusted EVM window, in accordance with certain embodiments of the present disclosure.

A further implementation is depicted in FIG. 9. A radio node (which may be a base station or user equipment) consists of a receiver and an EVM window determination unit. The receiver is able to adjust the receive timing. The node is informed by means of control signaling of the intended bandwidth within which reception of a signal should take place. Based on the indicated bandwidth, the EVM window determination unit determines an EVM window. The EVM window length if passed to the receiver, which uses the EVM window length information to adjust the receiver timing.

Figure 10:
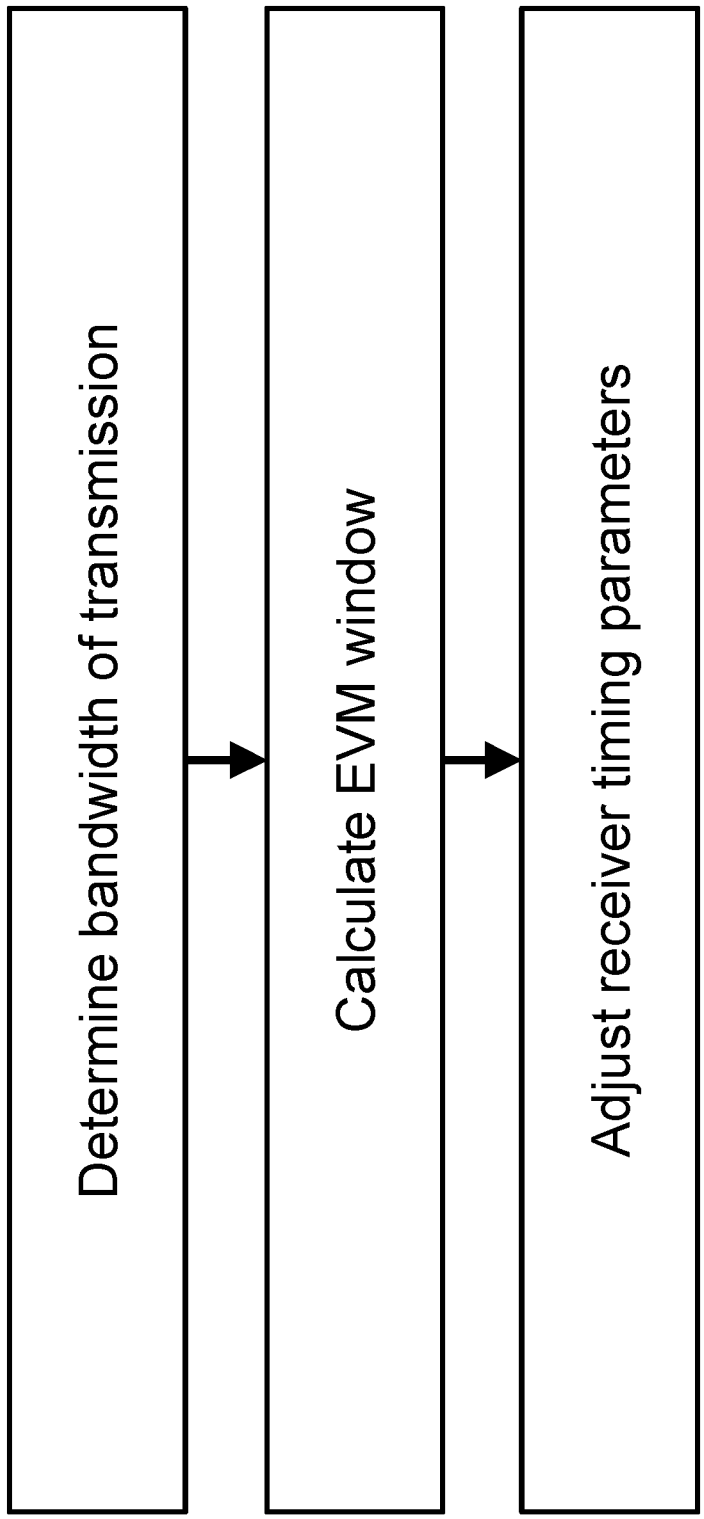
FIG. 10 illustrates an example of a method for receiving a signal according to an adjusted EVM window, in accordance with certain embodiments.

In certain embodiments, the radio node depicted in FIG. 9 may perform the method of FIG. 10. The method comprises determining the bandwidth of a transmission, calculating an EVM window based at least in part on the bandwidth, and adjusting receiver timing parameters based on the EVM window.

Figure 11:
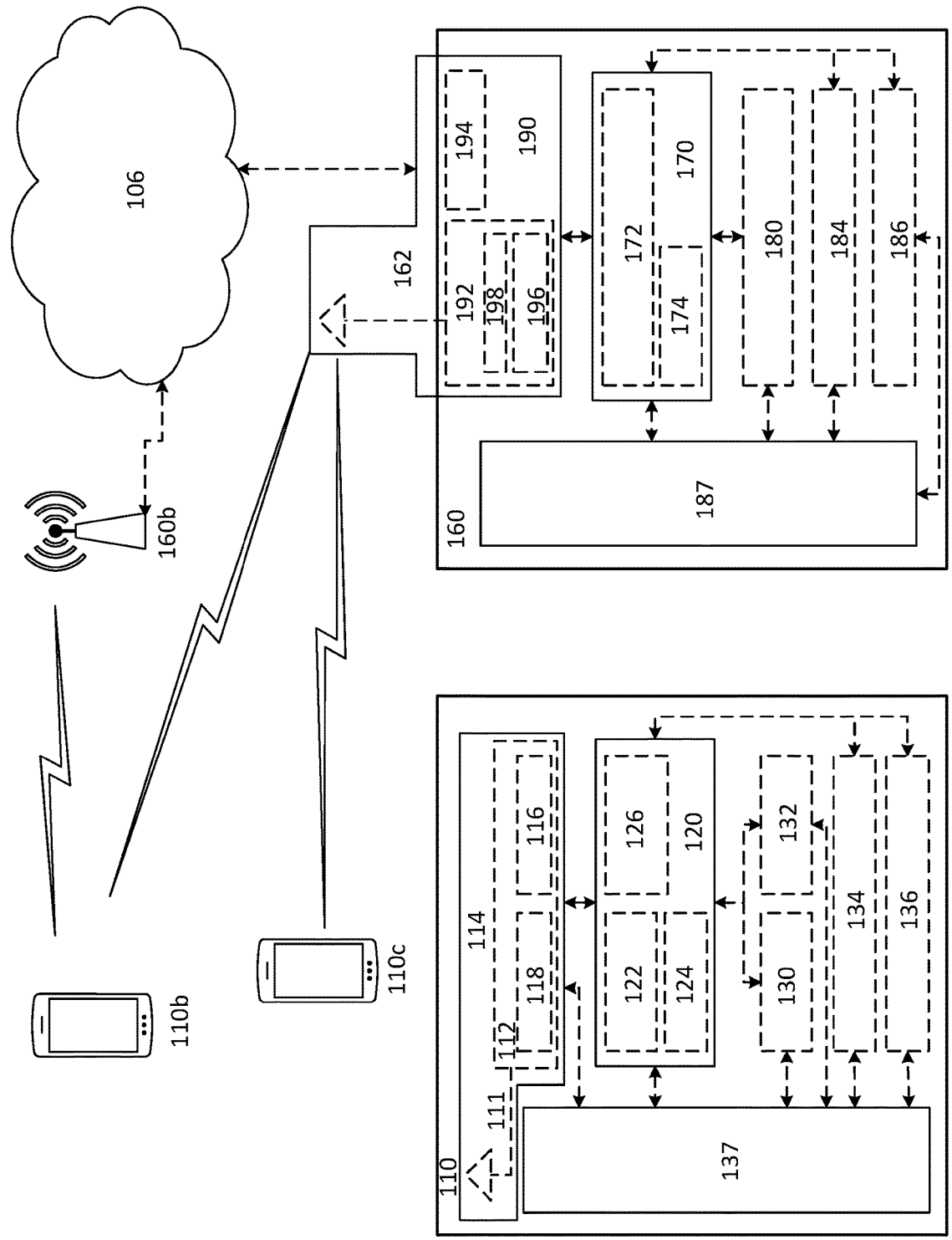
FIG. 11 illustrates an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 160 includes processing circuitry 170, device readable medium 180, interface 190, auxiliary equipment 184, power source 186, power circuitry 187, and antenna 162. Although network node 160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 11 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112;

rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 12:
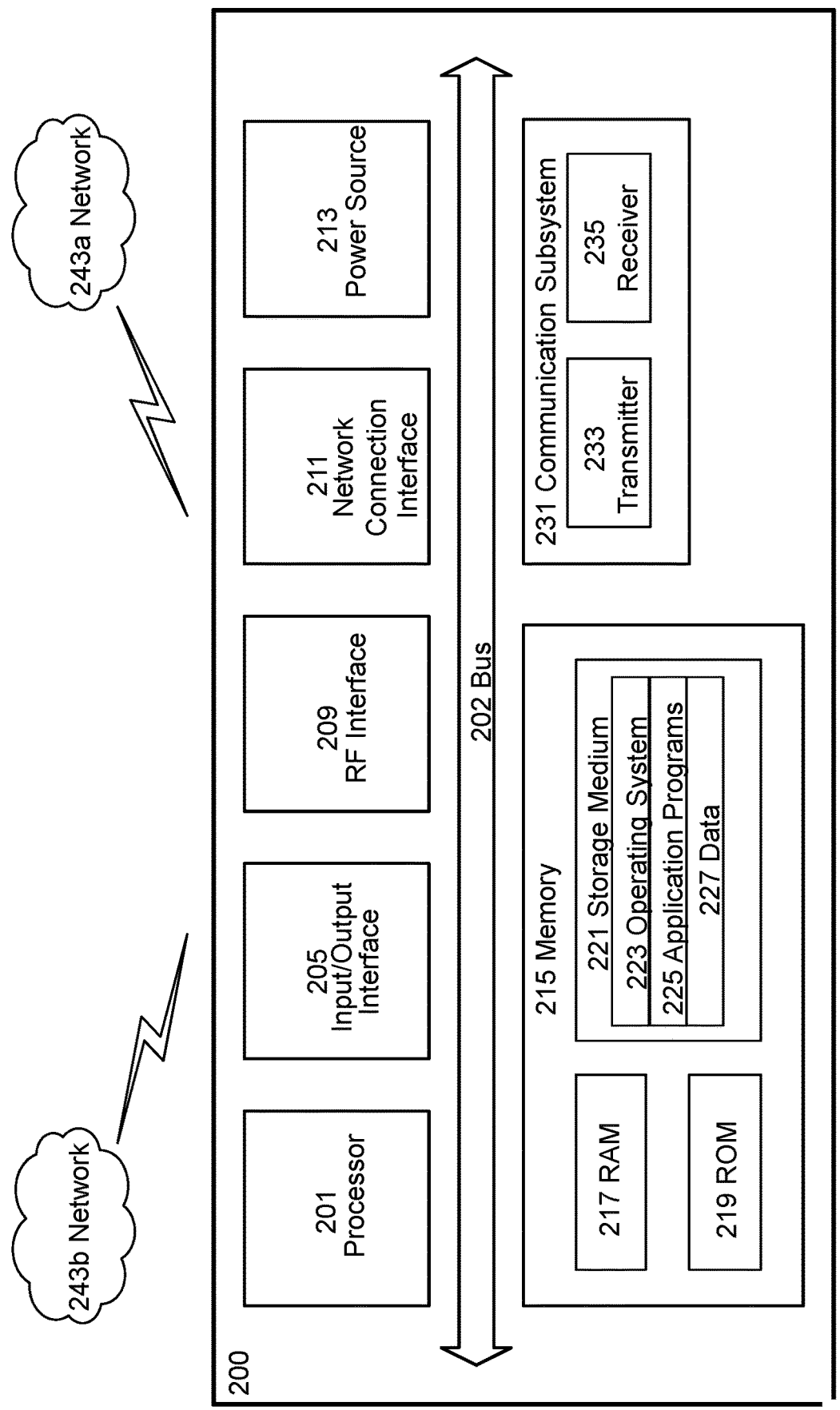
FIG. 12 illustrates an example of User Equipment in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 12, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 13:
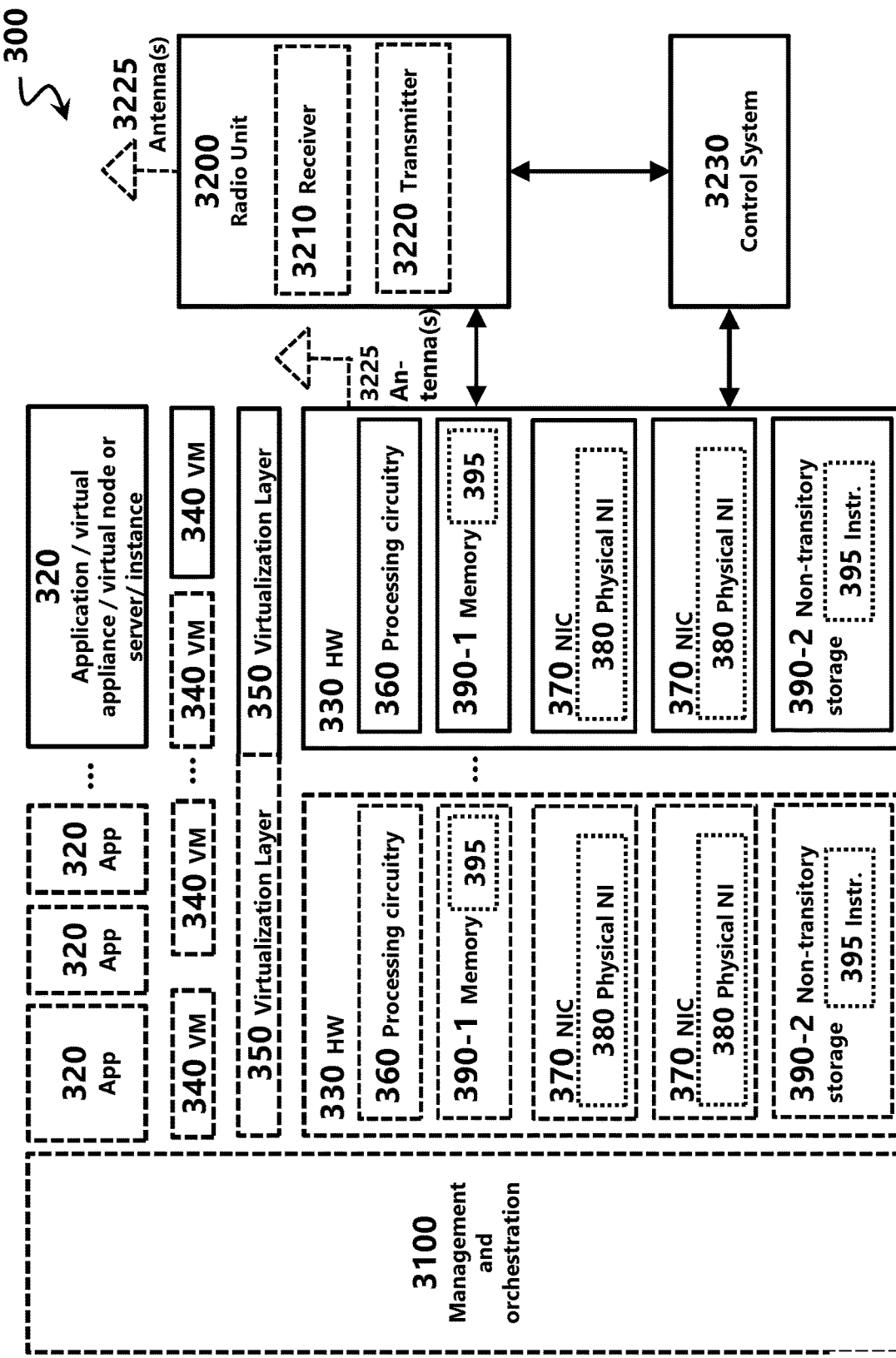
FIG. 13 illustrates an example of a virtualization environment in accordance with some embodiments.

FIG. 13 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 13, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 13.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
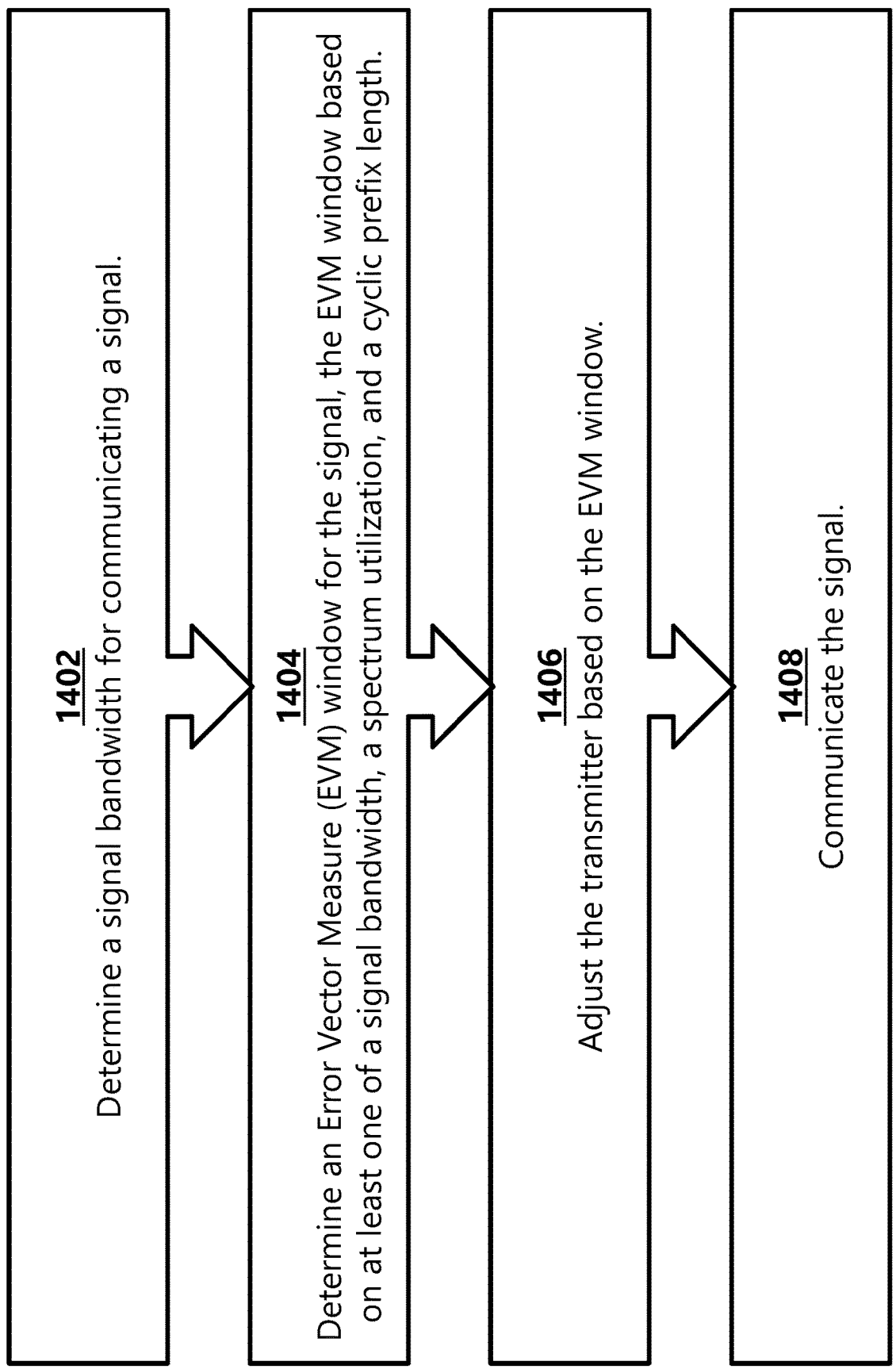
FIG. 14 illustrates an example of a method in accordance with some embodiments.

FIG. 14 depicts a method performed by a radio node, such as a wireless device or a base station, for configuring a transmitter to communicate a signal. In accordance with particular embodiments, the method begins at step 1402 with determining a signal bandwidth for communicating a signal. The method proceeds to step 1404 with determining an Error Vector Measure (EVM) window for the signal. In certain embodiments, the EVM window refers to a percentage of the cyclic prefix time. The EVM window is determined based on at least one of the signal bandwidth, a spectrum utilization, and a cyclic prefix length. The method proceeds to step 1406 with adjusting the transmitter based on the EVM window. In certain embodiments, adjusting the transmitter in step 1406 comprises adjusting filter parameters of the transmitter based on the EVM window. In some embodiments, the method further comprises communicating the signal after adjusting the transmitter based on the EVM window, as indicated by step 1408.

In certain embodiments, the EVM window determined in step 1404 is based at least in part on scaling that causes the EVM window to increase as the signal bandwidth increases from a first signal bandwidth to a second signal bandwidth. As an example, a first EVM window W1 may correspond to a first signal bandwidth within the range of 1-10 MHz, and a second EVM window W2 may correspond to a second signal bandwidth within the range of 11-20 MHz, where W2 is greater than W1. In the example, if the bandwidth of the signal to be communicated in step 1408 is 5 MHz, the transmitter may be adjusted based on EVM window W1. Alternatively, if the bandwidth of the signal to be communicated in step 1408 is 15 MHz, the transmitter may be adjusted based on EVM window W2. Other embodiments may define EVM windows for additional signal bandwidths (e.g., a third EVM window W3 may correspond to a third signal bandwidth) and/or different signal bandwidths (e.g., the first EVM window W1 may correspond to a first signal bandwidth within some other range, such as 5-100 MHz).

In certain embodiments, the EVM window determined in step 1404 is based at least in part on a scaling that causes the EVM window to increase as the cyclic prefix length increases from a first cyclic prefix length to a second cyclic prefix length. As an example, a first EVM window W1 may correspond to a first cyclic prefix length within the range of 1 to N symbols, and a second EVM window W2 may correspond to a second cyclic prefix length with more than N symbols, where W2 is greater than W1. In the example, if the cyclic prefix length of the signal to be communicated in step 1408 is less than or equal to N symbols, the transmitter may be adjusted based on EVM window W1. Alternatively, if the cyclic prefix length of the signal to be communicated in step 1408 is greater than N symbols, the transmitter may be adjusted based on EVM window W2. Other embodiments may define EVM windows for additional cyclic prefix lengths (e.g., a third EVM window W3 may correspond to a third cyclic prefix length) and/or different cyclic prefix lengths (e.g., the first EVM window W1 may correspond to a first cyclic prefix length within some other range).

Additional examples for determining the EVM window are described below with respect to FIGS. 17 and 18.

Figure 15:
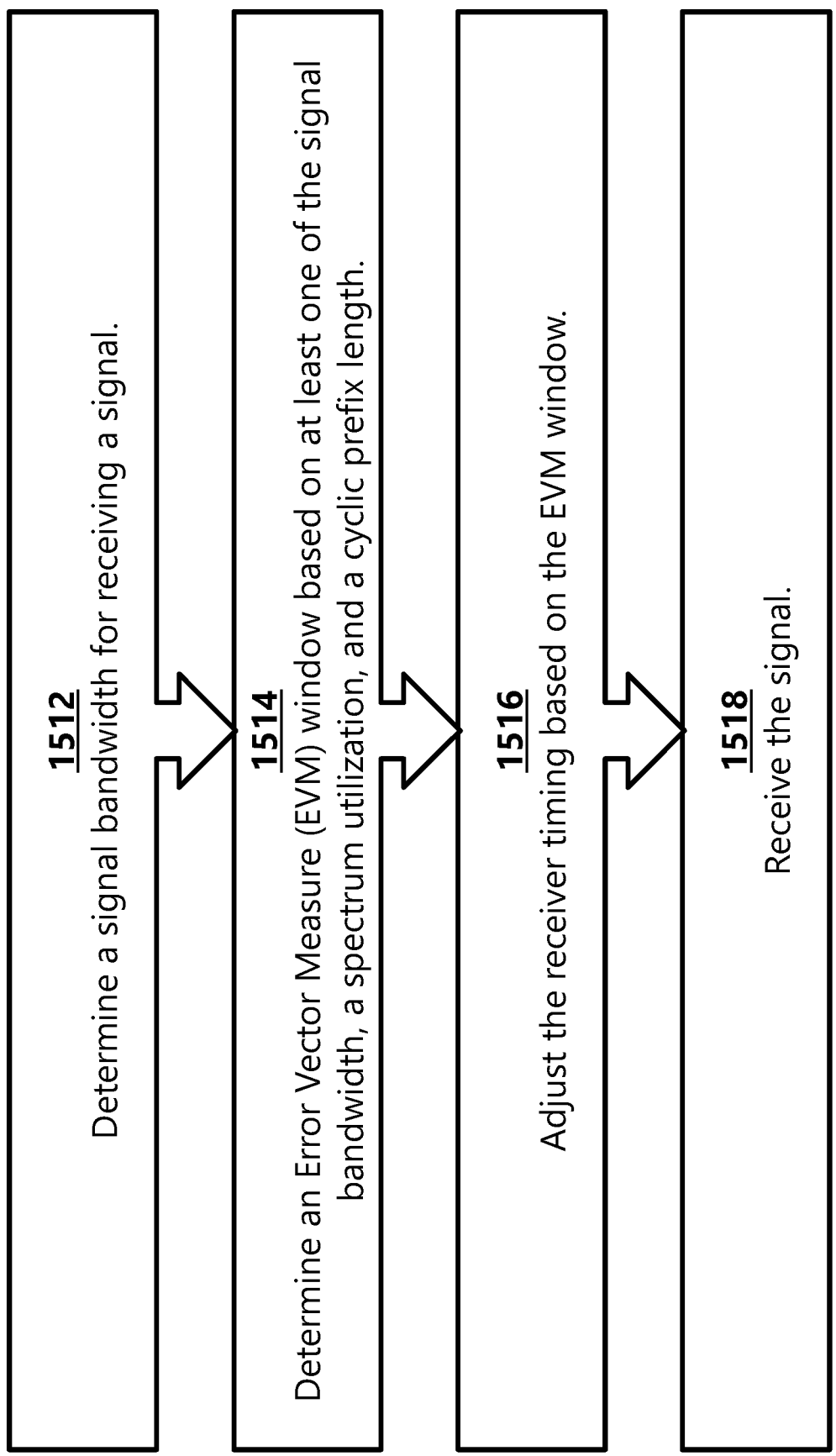
FIG. 15 illustrates an example of a method in accordance with some embodiments.

FIG. 15 depicts a method performed by a radio node, such as a wireless device or a base station, for configuring a receiver to communicate a signal. The method begins at step 1512 with determining a signal bandwidth for receiving a signal. In some embodiments, the signal bandwidth is determined based on receiving control signalling from a transmitter that indicates the intended bandwidth for the signal. The method proceeds to step 1514 with determining an Error Vector Measure (EVM) window based on at least one of the signal bandwidth, a spectrum utilization and a cyclic prefix length. In certain embodiments, step 1514 may be generally analogous to step 1404 discussed with respect to FIGS. 14, 17, and/or 18. For example, in certain embodiments, the EVM window may be determined using the equation EVM window=100%−($X_1$%*($Y_1$ MHz/$Y_2$ MHz)), with $Y_2$ corresponding to the signal bandwidth determined in step 1512. The method proceeds to step 1516 with adjusting receiver timing based on the EVM window.

Figure 16:
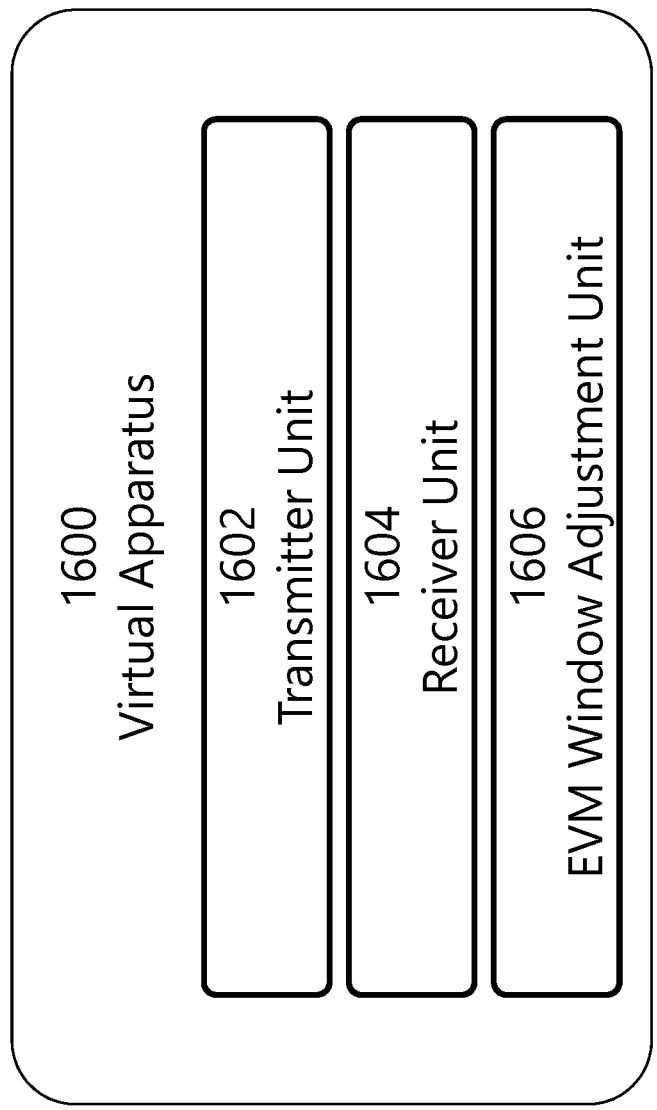
FIG. 16 illustrates an example of a virtualization apparatus in accordance with some embodiments.

FIG. 16 illustrates a schematic block diagram of an apparatus 1600 in a wireless network (for example, the wireless network shown in FIG. 11). The apparatus may be implemented in a wireless device or network node (e.g., wireless device 110 or network node 160 shown in FIG. 11). Apparatus 1600 is operable to carry out the example methods described with reference to FIGS. 8, 10, 14, 15, 17 and/or 18, and possibly any other processes or methods disclosed herein. It is also to be understood that the methods of FIGS. 8, 10, 14, 15, 17 and/or 18 are not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Transmitter Unit 1602, Receiver Unit 1604, EVM Window Adjustment Unit 1606, and any other suitable units of apparatus 1600 to perform corresponding functions according one or more embodiments of the present disclosure.

As illustrated in FIG. 16, apparatus 1600 includes Transmitter Unit 1602, Receiver Unit 1604, EVM Window Adjustment Unit 1606. Transmitter Unit 1602 transmits signals via a radio interface, Receiver Unit 1604 receives signals via a radio interface, and EVM Window Adjustment Unit 1606 determines an EVM window based on at least one of the signal bandwidth, a spectrum utilization, and a cyclic prefix length. In some embodiments, EVM Window Adjustment Unit 1606 provides the EVM window (or information derived from the EVM window, such as EVM window length) to Transmitter Unit 1602 so that Transmitter Unit 1602 can adjust the transmitter based on the EVM window. In some embodiments, EVM Window Adjustment Unit 1606 provides the EVM window (or information derived from the EVM window, such as EVM window length) to Receiver Unit 1604 so that Receiver Unit 1604 can adjust the receiver based on the EVM window.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
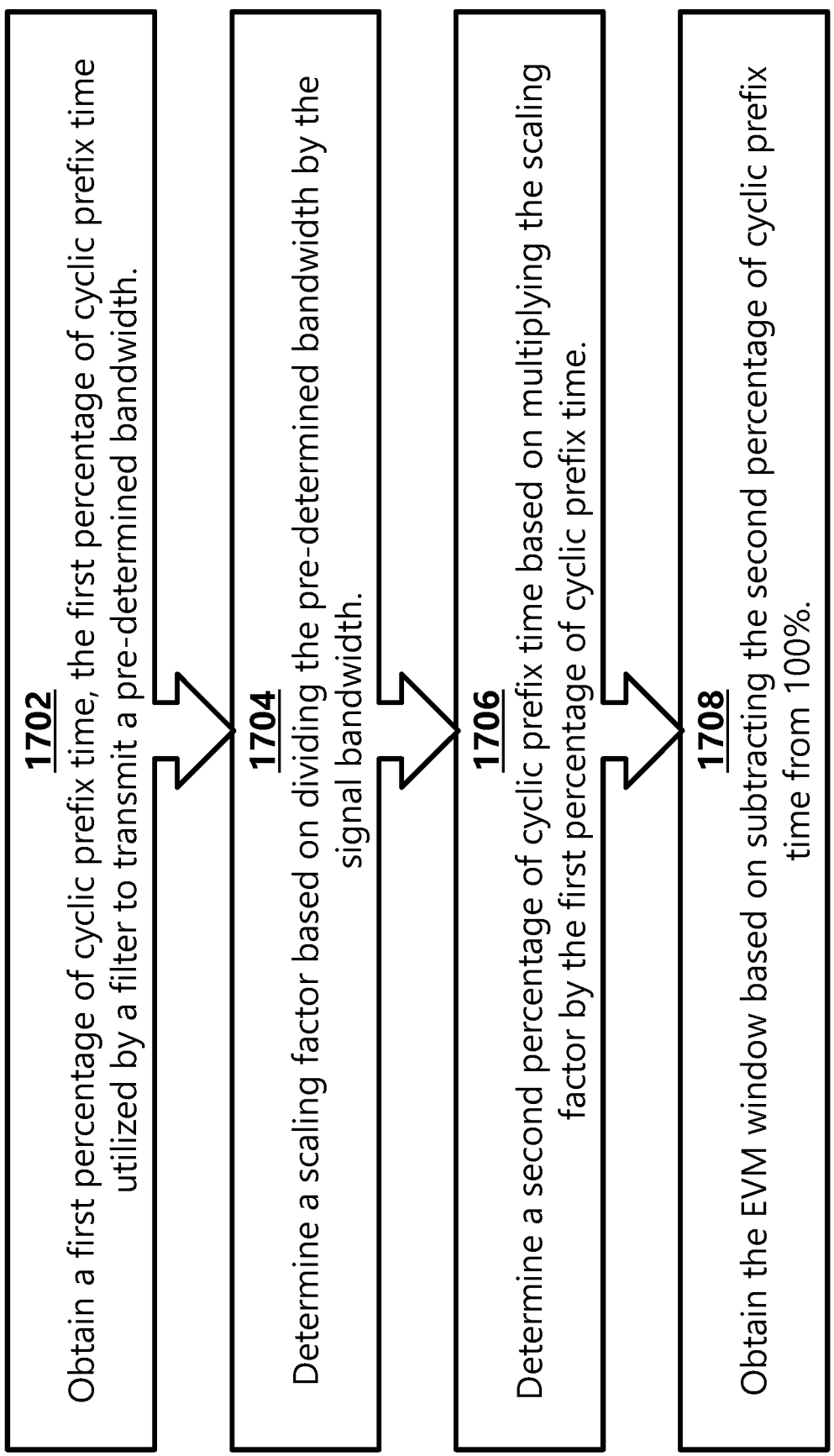
FIG. 17 illustrates an example of determining an EVM window based at least in part on signal bandwidth, in accordance with certain embodiments.
Figure 18:
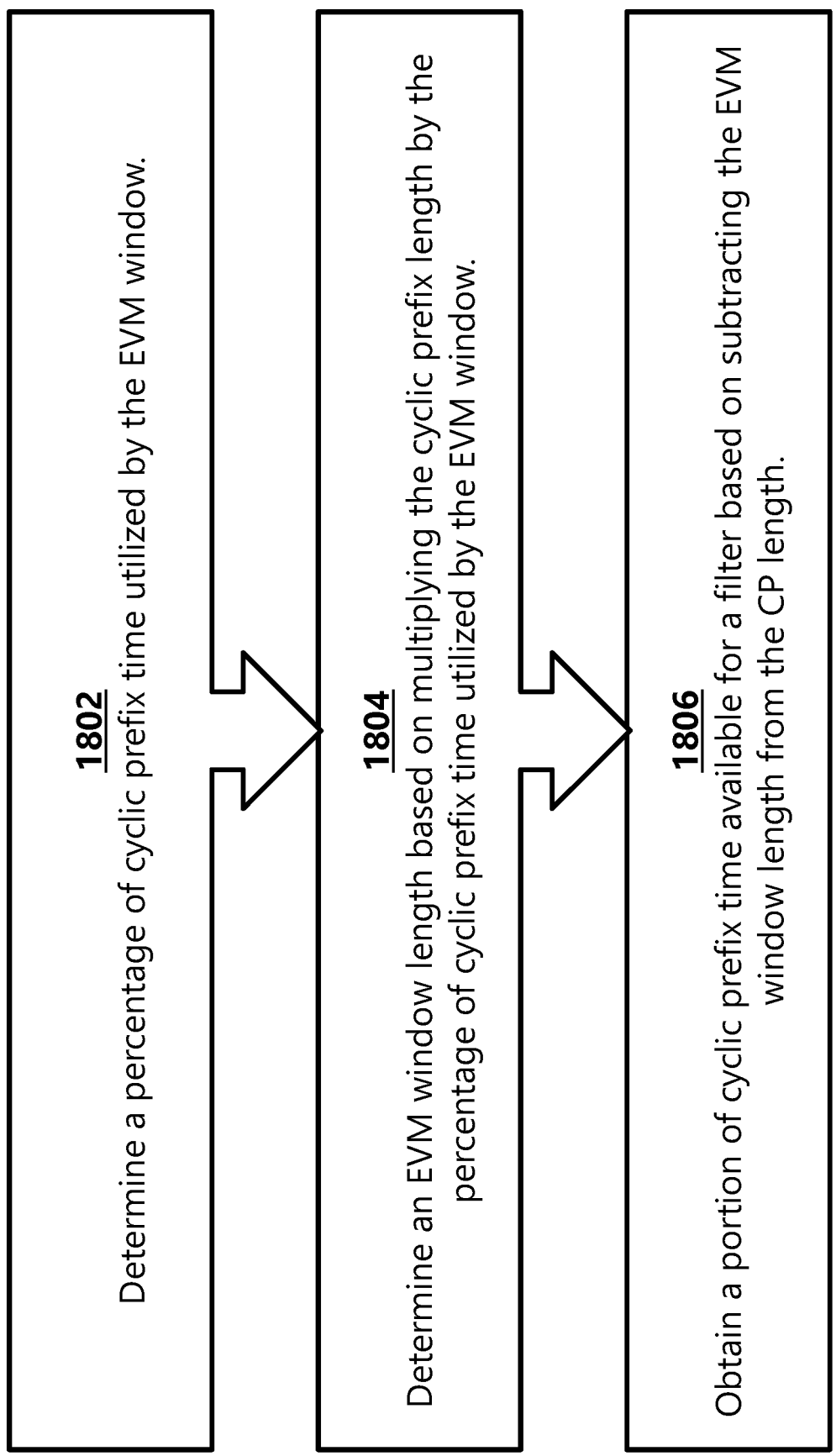
FIG. 18 illustrates an example of determining an EVM window based at least in part on cyclic prefix, in accordance with certain embodiments.

FIG. 17 illustrates an example of a method for determining an EVM window based at least in part on signal bandwidth. In certain embodiments, the steps of FIG. 17 may be included as substeps within step 1404 of FIG. 14. The method of FIG. 17 may begin at step 1702 with obtaining a first percentage of cyclic prefix time (e.g., $X_1$%). The first percentage of cyclic prefix time is utilized by a filter to transmit a pre-determined bandwidth (e.g., $Y_1$ MHz). At step 1704, the method determines a scaling factor (K) based on dividing the pre-determined bandwidth (e.g., $Y_1$ MHz) by the signal bandwidth determined in step 1402 (e.g., $Y_2$ MHz). The method determines a second percentage of cyclic prefix time (e.g., $X_2$%). The second percentage of cyclic prefix time is utilized by the filter to transmit the signal bandwidth determined in step 1402. The second percentage of cyclic prefix time is determined based on multiplying the scaling factor (K) by the first percentage of cyclic prefix time (e.g., $X_1$%). The EVM window is then obtained by subtracting the second percentage of cyclic prefix (e.g., $X_2$%) time from 100%. The example may be represented by the following equation:

$$\text{EVM window} = 100\% - X_2\%$$

where $X_2\% = K * X_1\%$
and where $K = Y_1 \text{ MHz}/Y_2 \text{ MHz}$;

In other words, EVM window=100%−($X_1$%*($Y_1$ MHz/$Y_2$ MHz)) such that EVM window is based at least in part on the bandwidth of the signal being transmitted ($Y_2$ MHz). Example values for this equation are discussed above (see the example above applying the equation EVM window=100%-60%*25/Bandwidth (MHz)).

As can be seen from the previous example, in certain embodiments the EVM window may be indicated as a percentage of the CP time. FIG. 18 illustrates an example of a method for determining an EVM window based at least in part on the CP time. The method may begin at step 1802 with determining a percentage of cyclic prefix time utilized by the EVM window. At step 1804, the length of the EVM window may be determined based on multiplying the cyclic prefix length by the percentage of cyclic prefix time utilized by the EVM window (i.e., the percentage that was determined in step 1802). A portion of the cyclic prefix available for use by a filter can then be determined in step 1806 based on subtracting the EVM window length from the CP length. The length of the CP and the EVM window can be represented in any suitable manner, such as a length of time (e.g., a number of milliseconds) or a number of symbols. In certain embodiments, the steps of FIG. 18 may be included as substeps within step 1404 of FIG. 14, and adjusting the transmitter in step 1406 of FIG. 14 may comprise adjusting the filter according to the portion of cyclic prefix time available for the filter, as determined in step 1806. In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a radio node for configuring a transmitter to communicate a signal, the method comprising:
   determining a signal bandwidth for communicating a signal;
   determining an Error Vector Measure (EVM) window based on at least one of the signal bandwidth, a spectrum utilization and a cyclic prefix length; and
   adjusting the transmitter based on the EVM window.
2. The method of the previous embodiment, further comprising communicating the signal after adjusting the transmitter based on the EVM window.
3. The method of any of the previous embodiments, wherein determining the EVM window comprises applying scaling that causes the EVM window to increase as the signal bandwidth increases.
4. The method of the previous embodiment, wherein applying the scaling comprises:
   obtaining a first percentage of cyclic prefix time, the first percentage of cyclic prefix time utilized by a filter to transmit a pre-determined bandwidth;
   determining a scaling factor based on dividing the pre-determined bandwidth by the signal bandwidth;
   determining a second percentage of cyclic prefix time, the second percentage of cyclic prefix time utilized by the filter to transmit the signal bandwidth, the second percentage of cyclic prefix time determined based on multiplying the scaling factor by the first percentage of cyclic prefix time; and
   subtracting the second percentage of cyclic prefix time from 100% to obtain the EVM window.
5. The method of any of the previous embodiments, wherein adjusting the transmitter comprises adjusting filter parameters of the transmitter based on the EVM window.
6. The method of any of the previous embodiments, wherein:
   determining the EVM window comprises determining a percentage of cyclic prefix time utilized by the EVM window;
   the method further comprises determining an EVM window length based on multiplying the cyclic prefix length by the percentage of cyclic prefix time utilized by the EVM window; and
   adjusting the transmitter based on the EVM window comprises obtaining a portion of cyclic prefix time available for a filter based on subtracting the EVM window length from the CP length.
7. The method of any of the previous embodiments, wherein the EVM requirement is applied over all physical resource blocks (PRBs) within the bandwidth.
8. The method of any of the previous embodiments 1-7, wherein the EVM requirement is applied only on PRBs at the edge of the bandwidth.
9. The method of any of the previous embodiments, wherein the radio node comprises a wireless device.
10. The method of any of the previous embodiments 1-8, wherein the radio node comprises a base station.

Group B Embodiments

11. A method performed by a radio node for configuring a receiver to receive a signal, the method comprising:
    determining a signal bandwidth for receiving a signal;
    determining an Error Vector Measure (EVM) window based on at least one of the signal bandwidth, a spectrum utilization and a cyclic prefix length; and
    adjusting receiver timing based on the EVM window.
12. The method of the previous embodiment, further comprising receiving the signal after adjusting the receiver timing based on the EVM window.
13. The method of any of the previous embodiments, wherein determining the EVM window comprises applying scaling that causes the EVM window to increase as the signal bandwidth increases.
14. The method of the previous embodiment, wherein applying the scaling comprises:
    obtaining a first percentage of cyclic prefix time, the first percentage of cyclic prefix time utilized to receive a pre-determined bandwidth;
    determining a scaling factor based on dividing the pre-determined bandwidth by the signal bandwidth;
    determining a second percentage of cyclic prefix time, the second percentage of cyclic prefix time utilized to receive the signal bandwidth, the second percentage of cyclic prefix time determined based on multiplying the scaling factor by the first percentage of cyclic prefix time; and
    subtracting the second percentage of cyclic prefix time from 100% to obtain the EVM window.
15. The method of any of the previous embodiments, wherein the signal bandwidth is determined based on receiving control signalling from a transmitter, the control signalling indicating the intended bandwidth for the signal.
16. The method of any of the previous embodiments, wherein:
    determining the EVM window comprises determining a percentage of cyclic prefix time utilized by the EVM window;
    the method further comprises determining an EVM window length based on multiplying the cyclic prefix length by the percentage of cyclic prefix time utilized by the EVM window; and
    adjusting the receiver timing based on the EVM window comprises obtaining a portion of cyclic prefix time available after subtracting the EVM window length from the CP length.

17. The method of any of the previous embodiments, wherein the EVM requirement is applied over all physical resource blocks (PRBs) within the bandwidth.

18. The method of any of the previous embodiments 11-16, wherein the EVM requirement is applied only on PRBs at the edge of the bandwidth.

19. The method of any of the previous embodiments, wherein the radio node comprises a wireless device.

20. The method of any of the previous embodiments 11-18, wherein the radio node comprises a base station.

Group C Embodiments

21. A radio node for configuring a transmitter to communicate a signal, the radio node comprising:
    processing circuitry configured to perform any of the steps of any of the Group A embodiments; and
    power supply circuitry configured to supply power to the wireless device.

22. A radio node for configuring a receiver to receive a signal, the radio node comprising:
    processing circuitry configured to perform any of the steps of any of the Group B embodiments;
    power supply circuitry configured to supply power to the wireless device.

23. A user equipment (UE) for configuring a transmitter to communicate a signal, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

24. A user equipment (UE) for configuring a receiver to receive a signal, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group B embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

25. A computer program, the computer program comprising instructions which when executed on a computer perform any of the steps of any of the Group A embodiments.

26. A computer program product comprising a computer program, the computer program comprising instructions which when executed on a computer perform any of the steps of any of the Group A embodiments.

27. A non-transitory computer-readable storage medium or carrier comprising a computer program, the computer program comprising instructions which when executed on a computer perform any of the steps of any of the Group A embodiments.

28. A computer program, the computer program comprising instructions which when executed on a computer perform any of the steps of any of the Group B embodiments.

29. A computer program product comprising a computer program, the computer program comprising instructions which when executed on a computer perform any of the steps of any of the Group B embodiments.

30. A non-transitory computer-readable storage medium or carrier comprising a computer program, the computer program comprising instructions which when executed on a computer perform any of the steps of any of the Group B embodiments.

The invention claimed is:

1. A method performed by a radio node for configuring a transmitter to communicate a signal, the method comprising:
    determining an Error Vector Measure (EVM) window for the signal, the EVM window based on at least one of a signal bandwidth, a spectrum utilization, and a cyclic prefix length, determining the EVM window comprising:
        obtaining a first percentage of cyclic prefix time, the first percentage of cyclic prefix time utilized by a filter to transmit a pre-determined bandwidth;
        determining a scaling factor based on dividing the pre-determined bandwidth by the signal bandwidth;
        determining a second percentage of cyclic prefix time, the second percentage of cyclic prefix time utilized by the filter to transmit the signal bandwidth, the second percentage of cyclic prefix time determined based on multiplying the scaling factor by the first percentage of cyclic prefix time; and
        subtracting the second percentage of cyclic prefix time from 100% to obtain the EVM window; and
    adjusting the transmitter based on the EVM window.

2. The method of claim 1, further comprising communicating the signal after adjusting the transmitter based on the EVM window.

3. The method of claim 1, wherein the EVM window increases as the signal bandwidth increases from a first signal bandwidth to a second signal bandwidth.

4. The method of claim 3, wherein the EVM window is based at least in part on a scaling.

5. The method of claim 1, wherein the EVM window increases as the cyclic prefix length increases from a first cyclic prefix length to a second cyclic prefix length.

6. The method of claim 5, wherein the EVM window is based at least in part on a scaling.

7. The method of claim 1, wherein adjusting the transmitter comprises adjusting filter parameters of the transmitter based on the EVM window.

8. The method of claim 1, wherein:
  determining the EVM window comprises determining a percentage of cyclic prefix time utilized by the EVM window;
  the method further comprises determining an EVM window length based on multiplying the cyclic prefix length by the percentage of cyclic prefix time utilized by the EVM window; and
  adjusting the transmitter based on the EVM window comprises obtaining a portion of cyclic prefix time available for a filter based on subtracting the EVM window length from the CP length.

9. The method of claim 8, further comprising:
  determining the signal bandwidth for communicating the signal.

10. The method of claim 9, wherein the EVM window corresponds to a percentage of cyclic prefix length.

11. A method performed by a radio node for configuring a receiver to receive a signal, the method comprising:
  determining an Error Vector Measure (EVM) window for a signal, the EVM window based on at least one of a signal bandwidth, a spectrum utilization, and a cyclic prefix length, determining the EVM window comprising:
    obtaining a first percentage of cyclic prefix time, the first percentage of cyclic prefix time utilized by a filter to transmit a pre-determined bandwidth;
    determining a scaling factor based on dividing the pre-determined bandwidth by the signal bandwidth;
    determining a second percentage of cyclic prefix time, the second percentage of cyclic prefix time utilized by the filter to transmit the signal bandwidth, the second percentage of cyclic prefix time determined based on multiplying the scaling factor by the first percentage of cyclic prefix time; and
    subtracting the second percentage of cyclic prefix time from 100% to obtain the EVM window; and
  adjusting receiver timing based on the EVM window.

12. The method of claim 11, further comprising receiving the signal after adjusting the receiver timing based on the EVM window.

13. The method of claim 11, wherein the EVM window increases as the signal bandwidth increases from a first signal bandwidth to a second signal bandwidth.

14. The method of claim 13, wherein the EVM window is based at least in part on a scaling.

15. The method of claim 11, wherein the EVM window increases as the cyclic prefix length increases from a first cyclic prefix length to a second cyclic prefix length.

16. The method of claim 15, wherein the EVM window is based at least in part on a scaling.

17. The method of claim 11, further comprising:
  determining the signal bandwidth for receiving the signal.

18. The method of claim 11, wherein the EVM window corresponds to a percentage of cyclic prefix length.

19. A radio node, comprising:
  a transmitter; and
  processing circuitry configured to:
    determine an Error Vector Measure (EVM) window for a signal to be communicated by the transmitter, the EVM window based on at least one of a signal bandwidth, a spectrum utilization, and a cyclic prefix length; and
    adjust the transmitter based on the EVM window,
    determining the EVM window comprising:
      obtaining a first percentage of cyclic prefix time, the first percentage of cyclic prefix time utilized by a filter to transmit a pre-determined bandwidth;
      determining a scaling factor based on dividing the pre-determined bandwidth by the signal bandwidth;
      determining a second percentage of cyclic prefix time, the second percentage of cyclic prefix time utilized by the filter to transmit the signal bandwidth, the second percentage of cyclic prefix time determined based on multiplying the scaling factor by the first percentage of cyclic prefix time; and
      subtracting the second percentage of cyclic prefix time from 100% to obtain the EVM window.

\* \* \* \* \*